US009698999B2

(12) United States Patent
Mutagi

(10) Patent No.: US 9,698,999 B2
(45) Date of Patent: Jul. 4, 2017

(54) NATURAL LANGUAGE CONTROL OF SECONDARY DEVICE

(71) Applicant: Amazon Technologies, Inc., Seattle, WA (US)

(72) Inventor: Rohan Mutagi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 14/094,270

(22) Filed: Dec. 2, 2013

(65) Prior Publication Data
US 2015/0154976 A1 Jun. 4, 2015

(51) Int. Cl.
G10L 21/00 (2013.01)
H04L 12/28 (2006.01)
G10L 15/22 (2006.01)

(52) U.S. Cl.
CPC ........ H04L 12/2829 (2013.01); H04L 12/281 (2013.01); H04L 12/282 (2013.01); H04L 12/2825 (2013.01); *G10L 2015/223* (2013.01)

(58) Field of Classification Search
CPC ..... G10L 15/26; G10L 15/30; G10L 15/1815; G10L 2015/088; G10L 2015/223; H04L 67/025; H04L 67/125; G06F 3/0416; G06F 3/04847
USPC ............... 704/275, 274, 260, 251, 235, 208; 715/771; 709/224, 223, 220; 707/670
See application file for complete search history.

(56) References Cited

U.S. PATENT DOCUMENTS

| 6,397,186 | B1 * | 5/2002 | Bush ...................... G10L 15/26 704/272 |
| 7,099,825 | B1 * | 8/2006 | Cook ...................... G10L 15/30 379/202.01 |
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,078,472 | B2 * | 12/2011 | Resch .................... G10L 15/26 704/275 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

(Continued)

*Primary Examiner* — Michael Colucci
(74) *Attorney, Agent, or Firm* — Lee & Hayes, PLLC

(57) ABSTRACT

Natural language controlled devices may be configured to activate command recognition in response to one or more wake words. Techniques are provided to enable a voice controlled system to detect or receive an indication of a secondary device available to be controlled. The voice controlled system communicates with the secondary device to obtain information related to the secondary device. The voice controlled system may output of an audio query requesting audio input data related to controlling the secondary device from a user and generate, based on the requested audio input data, recognition data utilized to recognize of at least part of one or more commands to issue one or more controls to the secondary device.

21 Claims, 14 Drawing Sheets

(56) References Cited

U.S. PATENT DOCUMENTS

| | | | | |
|---|---|---|---|---|
| 8,099,289 | B2* | 1/2012 | Mozer | G10L 15/30 704/270 |
| 8,131,549 | B2* | 3/2012 | Teegan | G10L 13/033 704/260 |
| 8,340,975 | B1* | 12/2012 | Rosenberger | G10L 15/22 704/270 |
| 8,660,849 | B2* | 2/2014 | Gruber | G06F 17/3087 340/988 |
| 8,793,220 | B2* | 7/2014 | Peairs | G06F 17/30011 707/670 |
| 2002/0052938 | A1* | 5/2002 | Kanemitsu | H04L 41/0253 709/220 |
| 2002/0193989 | A1* | 12/2002 | Geilhufe | G10L 15/26 704/208 |
| 2003/0093281 | A1* | 5/2003 | Geilhufe | G10L 13/00 704/275 |
| 2007/0233842 | A1* | 10/2007 | Roberts | G06F 21/552 709/223 |
| 2007/0298885 | A1 | 12/2007 | Tran | |
| 2008/0059188 | A1 | 3/2008 | Konopka et al. | |
| 2009/0192785 | A1 | 7/2009 | Cavender et al. | |
| 2010/0114577 | A1 | 5/2010 | Hayn et al. | |
| 2011/0022977 | A1* | 1/2011 | Eldering | G06F 1/3203 715/771 |
| 2011/0060587 | A1* | 3/2011 | Phillips | G10L 15/30 704/235 |
| 2012/0223885 | A1 | 9/2012 | Perez | |
| 2012/0232886 | A1 | 9/2012 | Capuozzo et al. | |
| 2013/0321340 | A1* | 12/2013 | Seo | G06F 1/1641 345/174 |
| 2014/0100854 | A1* | 4/2014 | Chen | H04L 12/282 704/275 |
| 2015/0052231 | A1* | 2/2015 | Sun | H04L 41/0803 709/223 |
| 2015/0067141 | A1* | 3/2015 | Nishimura | H04L 41/0668 709/224 |
| 2016/0358603 | A1* | 12/2016 | Azam | G10L 15/22 |

OTHER PUBLICATIONS

PCT Search Report and Written Opinion mailed Mar. 2, 2015 for PCT Application No. PCT/US14/67495, 10 Pages.

* cited by examiner

1300 ⤴

```
┌─────────────────────────────────────────────────────────────────┐
│ UPON INTERACTING WITH AN ADDITIONAL USER OR DETECTING THE       │
│ PRESENCE OF THE ADDITIONAL USER, DETERMINE THAT THE ADDITIONAL  │
│ USER HAS NOT BEEN CONFIGURED TO CONTROL THE SECONDARY DEVICE    │
│ (E.G., A SECONDARY DEVICE ALREADY SET UP BY ANOTHER USER)       │
│                              1302                                │
└─────────────────────────────────────────────────────────────────┘
                                │
                                ▼
┌─────────────────────────────────────────────────────────────────┐
│ OUTPUT AUDIO QUERY TO ADDITIONAL USER INDICATING THAT A NEW     │
│ SECONDARY DEVICE WAS ADDED BY ANOTHER USER AND ASKING WHAT THE  │
│ USER WOULD LIKE TO CALL THE SECONDARY DEVICE                    │
│                              1304                                │
└─────────────────────────────────────────────────────────────────┘
                                │
                                ▼
┌─────────────────────────────────────────────────────────────────┐
│                  CONTINUE FROM 1114 TO 1216                      │
└─────────────────────────────────────────────────────────────────┘
```

FIG. 13

NATURAL LANGUAGE CONTROL OF SECONDARY DEVICE

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input.

The use of natural language input to interact with computing devices presents many challenges. One example challenge concerns the discovery, pairing, and configuration of secondary devices that are controlled by a primary computing device or system which in turn provides for natural language input by users to control the primary computing device and the secondary device(s). In general, the user may provide such information by clicking on a window, pressing an icon on a touch screen, or otherwise explicitly configuring the primary and secondary computing devices using a non-natural language input. However, some systems may not provide for non-natural language input to the primary computing device or may only provide for limited non-natural language input to the primary computing device.

Accordingly, there is a need for techniques to provide a satisfactory user experience when interacting with natural language control devices in such situations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 13 shows an example process for configuring the voice controlled device to issue instructions, commands or controls to the secondary device based on voice input from an additional user.

DETAILED DESCRIPTION

Techniques for controlling a secondary device by natural language input, via a primary speech-responsive device, are described. Today, some computing devices require users to utilize physical buttons, soft keys, graphical user interfaces, and other non-natural language input to enable the primary device to discover secondary device(s), pair with the secondary device(s) and/or configure the interface and/or control of the secondary device(s). This may be the case even though the primary computing device provides for natural language input for other processes. Moreover, some devices may not be equipped with non-natural language input capabilities or may have limited non-natural language input capabilities. However, as human-machine interfaces evolve, users may wish and even expect to provide such natural language commands to the device itself without resorting to supplemental non-natural language input.

In general, natural language input may indicate an act or command to be executed. Voice interactions are one type of natural language command. Thus, a user may talk to a computing device and expect the device to appropriately act on his or her spoken commands. For example, with regard to speech input, a user may ask "What time is it?" and expect the computing device to correctly process and answer the query.

As users become more comfortable with controlling devices through speech, new challenges arise. One challenge is that some devices, which have not traditionally been considered "smart" may, in the future, be controllable with speech. For instance, users may want to say, "Turn on the desk lamp", and expect the desk lamp to illuminate.

As such secondary devices are added to the environment, another challenge is how to discover and use these devices through speech. Suppose a user receives a new lamp, and wants to control it by speech. According to the techniques described herein, a user may interact with a natural language controlled primary device to discover secondary device(s), pair with the secondary device(s), and/or configure them for voice control operation.

Natural language commands are not limited to speech and may also be provided as, for example, handwritten commands or the like. As such, while example implementations and example usage scenarios described herein refer to voice controlled devices, the implementations are not limited thereto and may include natural language input controlled devices in general.

Figure 1:
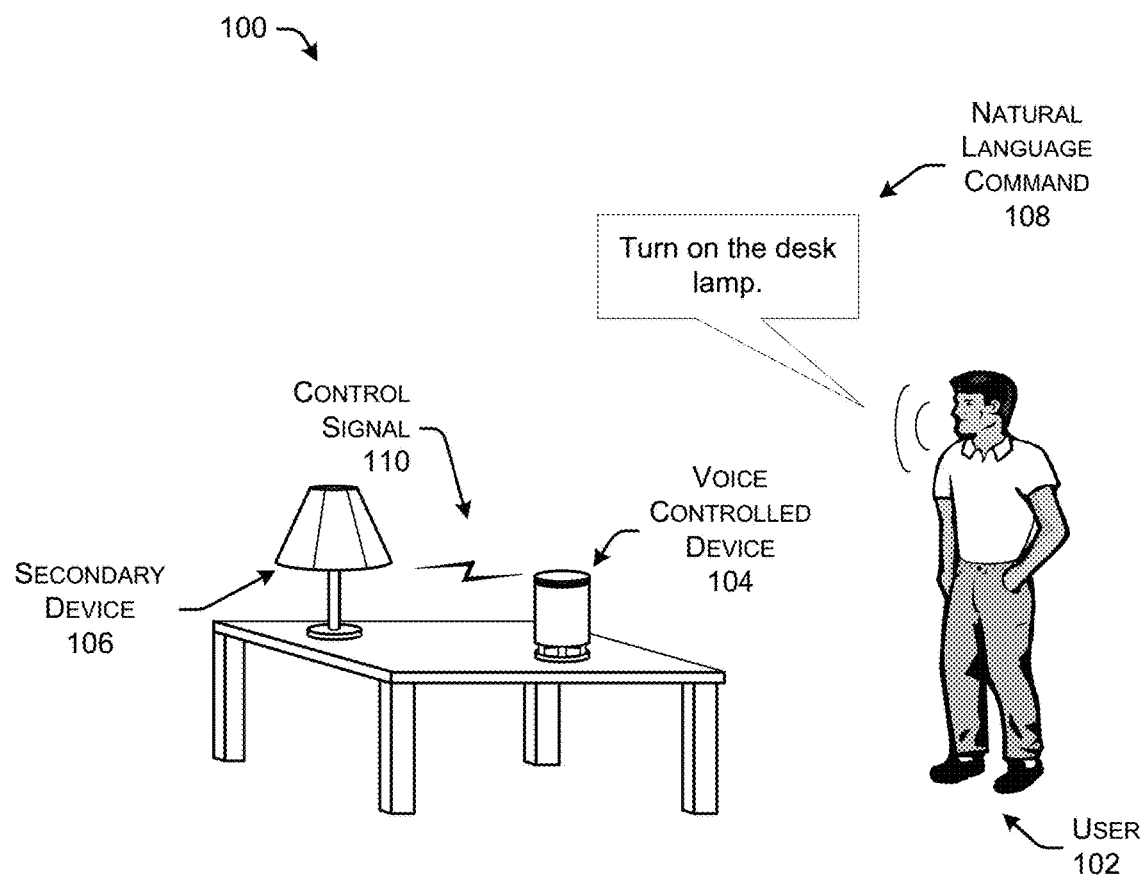
FIG. 1 is a schematic diagram of an illustrative environment in which some implementations.

FIG. 1 is an illustration of an example scenario 100 in which a user 102 utilizes a voice controlled device 104 to control a secondary device 106. In FIG. 1, the secondary device is illustrated as a desk lamp. FIG. 1 is provided to aid in comprehension of the disclosed techniques and systems. As such, it should be understood that the discussion that follows is non-limiting.

In the illustrated scenario 100, the user 102 has previously configured the voice controlled device 104 to respond to natural language commands of the user 102. Additionally, the user 102 has performed a process to pair the voice controlled device 104 and the secondary device 106 (e.g., establish a control link) and to configure the control of the secondary device 106 by the voice controlled device 104 using natural language commands.

As shown in FIG. 1, the user 102 would like to turn on the secondary device 106 using a voice command to the voice controlled device 104. Accordingly, the user 102 speaks a natural language command 108, such as "Turn on the desk lamp." The sound waves corresponding to the natural language command 108 may be captured by one or more microphone(s) of the voice controlled device 104. In some implementations, the voice controlled device 104 may process the captured signal. In other implementations, some or all of the processing of the sound may be performed by additional computing devices (e.g. servers) connected to the voice controlled device 104 over one or more networks. If the processing of the sound recognizes a valid command, the voice controlled device 104 may output a corresponding control signal 110 to the secondary device 106 in question. In the illustrated example, the voice controlled device 104 recognizes the request to turn on the lamp 106 and outputs an appropriate control signal 110 to illuminate the lamp 106.

In some implementations, to provide such natural language command functionality, the voice controlled device 104 or other computing device(s) performing the processing of the natural language input may utilize customizable or user-specific recognition functions. For example, the voice controlled device 104 may utilize customizable or user-specific names for secondary devices and/or customizable or user-specific commands. For example, a first user 102 may refer to the secondary device 106 of FIG. 1 as "desk lamp" and a second user 102 may refer to the secondary device 106 of FIG. 1 as "table lamp." As such, in some implementations, during the pairing and configuration of the secondary device 106 to operate based on control signals 110 from the voice controlled device 104, the voice controlled device 104 may ask the user 102 to provide the custom and/or user specific names or commands that are to be used in controlling the secondary device 106.

In some implementations, the custom and/or user specific names or commands may be associated with an account or profile of the user 102 (per user) and/or an account or profile for a set of users (e.g., a household name). For example, the members of the household of user 102 of FIG. 1 may refer to the secondary device 106 as "table lamp." Thus, the user 102 may also refer to the secondary device 106 as "table lamp" at times and the user 102 may alternate between "table lamp" and "desk lamp." To facilitate recognition for the user 102 in such a scenario, the user 102 may wish to assign the custom name "table lamp" to the secondary device 106 for the household of the user 102 and have a user specific name of "desk lamp" assigned to the secondary device 106 for the profile of the user 102. Other members of the household of the user 102 may subsequently be prompted or initiate the process to provide user specific names for the secondary device 106 of FIG. 1 as desired. Such an example process for setting up accounts and/or profiles of the other members of the household of the user 102 is illustrated and described with regard to FIG. 14.

As mentioned above, the scenario illustrated FIG. 1 is merely an example for ease of comprehension and is not intended as a limitation on the application of the disclosed techniques and systems. Additional features and variations would be apparent to one of ordinary skill in the art in view of this disclosure.

Figure 2:
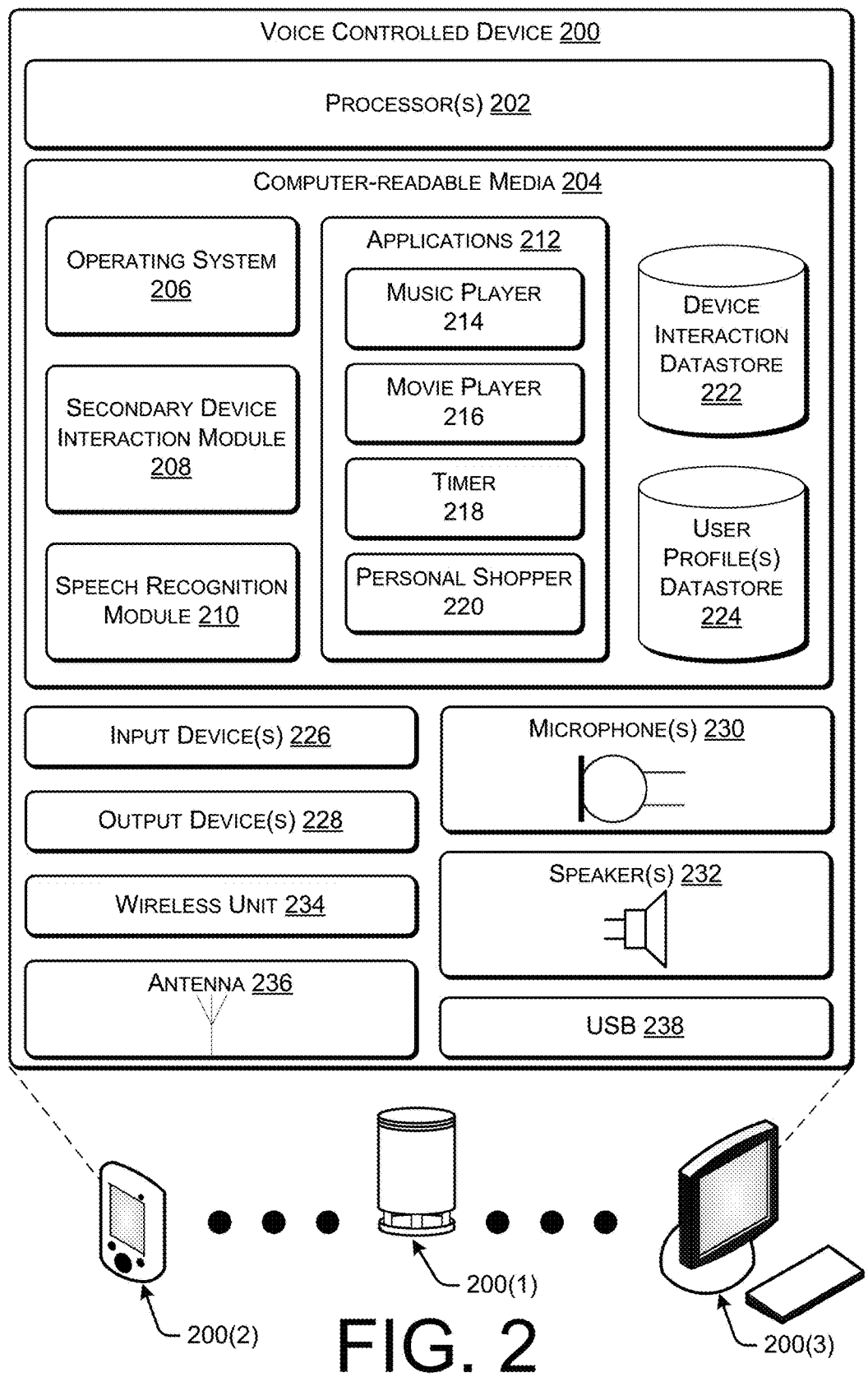
FIG. 2 shows a functional block diagram of selected components implemented at a voice controlled device.

FIG. 2 shows selected functional components of a natural language input controlled device, specifically, a voice controlled device 200. The voice controlled device 200 may be similar to and implement similar functionality to those discussed above with regard to voice controlled device 104 of FIG. 1. The voice controlled device 200 may be implemented as a standalone device 200(1) that is relatively simple in terms of functional capabilities with limited input/output components, memory, and processing capabilities. For instance, the voice controlled device 200(1) does not have a keyboard, keypad, or other form of mechanical input. Nor does it have a display or touch screen to facilitate visual presentation and user touch input. Instead, the device 200(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 200(1) is through voice input and audible output.

The voice controlled device 200 may also be implemented as a mobile device 200(2) such as a smart phone or personal digital assistant. The mobile device 200(2) may include a touch-sensitive display screen and various buttons for providing input as well as additional functionality such as the ability to send and receive telephone calls. Alternative implementations of the voice controlled device 200 may also include configuration as a personal computer 200(3). The personal computer 200(3) may include a keyboard, a mouse, a display screen, and any other hardware or functionality that is typically found on a desktop, notebook, netbook, or other personal computing devices. The devices 200(1), 200(2), and 200(3) are merely examples and not intended to be limiting, as the techniques described in this disclosure may be used in essentially any device that has an ability to recognize speech input or other types of natural language input.

In the illustrated implementation, the voice controlled device 200 includes one or more processors 202 and computer-readable media 204. In some implementations, the processors(s) 202 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program modules, program data, and/or one or more operating systems.

The computer-readable media 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 204 may be implemented as computer-readable storage media ("CRSM"), which may be any available physical media accessible by the processor(s) 202 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202.

Several modules such as instruction, datastores, and so forth may be stored within the computer-readable media 204 and configured to execute on the processor(s) 202. A few example functional modules are shown as applications stored in the computer-readable media 204 and executed on the processor(s) 202, although the same functionality may alternatively be implemented in hardware, firmware, or as a system on a chip (SOC).

An operating system module 206 may be configured to manage hardware and services within and coupled to the device 200 for the benefit of other modules. A secondary device interaction module 208 may be configured to perform operations related to discovering secondary device(s), pairing with the secondary device(s) and/or configuring the interface and/or control of the secondary device(s). For example, as discussed above, once the voice controlled device has been paired with a secondary device, some implementations may provide for customized or user specific functionality, such as custom and or user specific names for secondary devices or custom and/or user specific commands. Although discussed herein as "custom," in some implementations, the user may be provided with a name or command and asked to speak the name or command to allow for the voice controlled device to be able to recognize the user's speaking of the name or command. A speech processing module 210 may employ any number of conventional speech processing techniques such as use of speech recognition, natural language understanding, and extensive lexicons to interpret voice input. For example, the speech processing module 210 may employ general speech recognition techniques as well as speech or phrase recognition particular to the names or commands utilized for controlling the secondary device(s) 106. In some implementations, the speech processing module 210 may employ a hidden Markov model that represents the name or command itself. This model may be created in advance or on the fly depending on the particular implementation. Once initialized and active, some implementations of the speech processing module 210 operate to detect any of the natural language commands for which it is programmed or to which it is capable of responding. While in the particular implementation shown in FIG. 1, the speech processing module 210 is shown as a single module for performing secondary device name and command recognition as well as general speech recognition, in other implementations, these functionalities may be separated. Alternatively, the secondary device name and command recognition may be incorporated into the secondary device interaction module 208.

The voice controlled device 200 may also include a plurality of applications 212 stored in the computer-readable media 204 or otherwise accessible to the device 200. In this implementation, the applications 212 are a music player 214, a movie player 216, a timer 218, and a personal shopper 220. However, the voice controlled device 200 may include any number or type of applications and is not limited to the specific examples shown here. The music player 214 may be configured to play songs or other audio files. The movie player 216 may be configured to play movies or other audio visual media. The timer 218 may be configured to provide the functions of a simple timing device and clock. The personal shopper 220 may be configured to assist a user in purchasing items from web-based merchants.

Datastores present may include a device interaction datastore 222 and a user profile(s) datastore 224. The device interaction datastore 222 may store data that is used in the discovery, pairing and configuration of secondary devices by the secondary device interaction module 208. Depending on the secondary device and the particular implementation, the device interaction datastore 222 may store various information such as default command templates, suggested names for types of devices, device discovery, pairing and configuration procedures and so on. The user profile(s) datastore 224 may store one or more user profiles of users that have interacted with the device 200. The user profile(s) datastore 224 may include user characteristics, preferences, user specific names and commands (e.g., user specific names and commands relating to secondary devices), usage history, library information (e.g., music play lists), online purchase history, and other information specific to an individual user. Either or both of the device interaction datastore 222 and the user profile(s) datastore 224 may store custom but non-user specific names and commands and the like (e.g., household names and commands relating to secondary devices).

Generally, the voice controlled device 200 has input devices 226 and output devices 228. The input devices 226 may include a keyboard, keypad, mouse, touch screen, joystick, control buttons, etc. In some implementations, one or more microphones 230 may function as input devices 226 to receive audio input, such as user voice input. The output devices 228 may include a display, a light element (e.g., LED), a vibrator to create haptic sensations, or the like. In some implementations, one or more speakers 232 may function as output devices 228 to output audio sounds.

A user 102 may interact with the voice controlled device 200 by speaking to it, and the one or more microphone(s) 230 captures the user's speech. The voice controlled device 200 can communicate back to the user by emitting audible statements through the speaker 232. In this manner, the user 102 can interact with the voice controlled device 200 solely through speech, without use of a keyboard or display.

The voice controlled device 200 may further include a wireless unit 234 coupled to an antenna 236 to facilitate a wireless connection to a network. The wireless unit 234 may implement one or more of various wireless technologies, such as Wi-Fi, Bluetooth, RF, and so on. A USB port 238 may further be provided as part of the device 200 to facilitate a wired connection to a network, or a plug-in network device that communicates with other wireless networks. In addition to the USB port 238, or as an alternative thereto, other forms of wired connections may be employed, such as a broadband connection.

Accordingly, when implemented as the primarily-voice-operated device 200(1), there may be no input devices, such as navigation buttons, keypads, joysticks, keyboards, touch screens, and the like other than the microphone(s) 230. Further, there may be no output such as a display for text or graphical output. The speaker(s) 232 may be the main output device. In one implementation, the voice controlled device 200(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 200(1) may be implemented as an aesthetically appealing device with smooth and rounded surfaces, with one or more apertures for passage of sound waves. The device 200(1) may merely have a power cord and optionally a wired interface (e.g., broadband, USB, etc.). As a result, the device 200(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Figure 3:
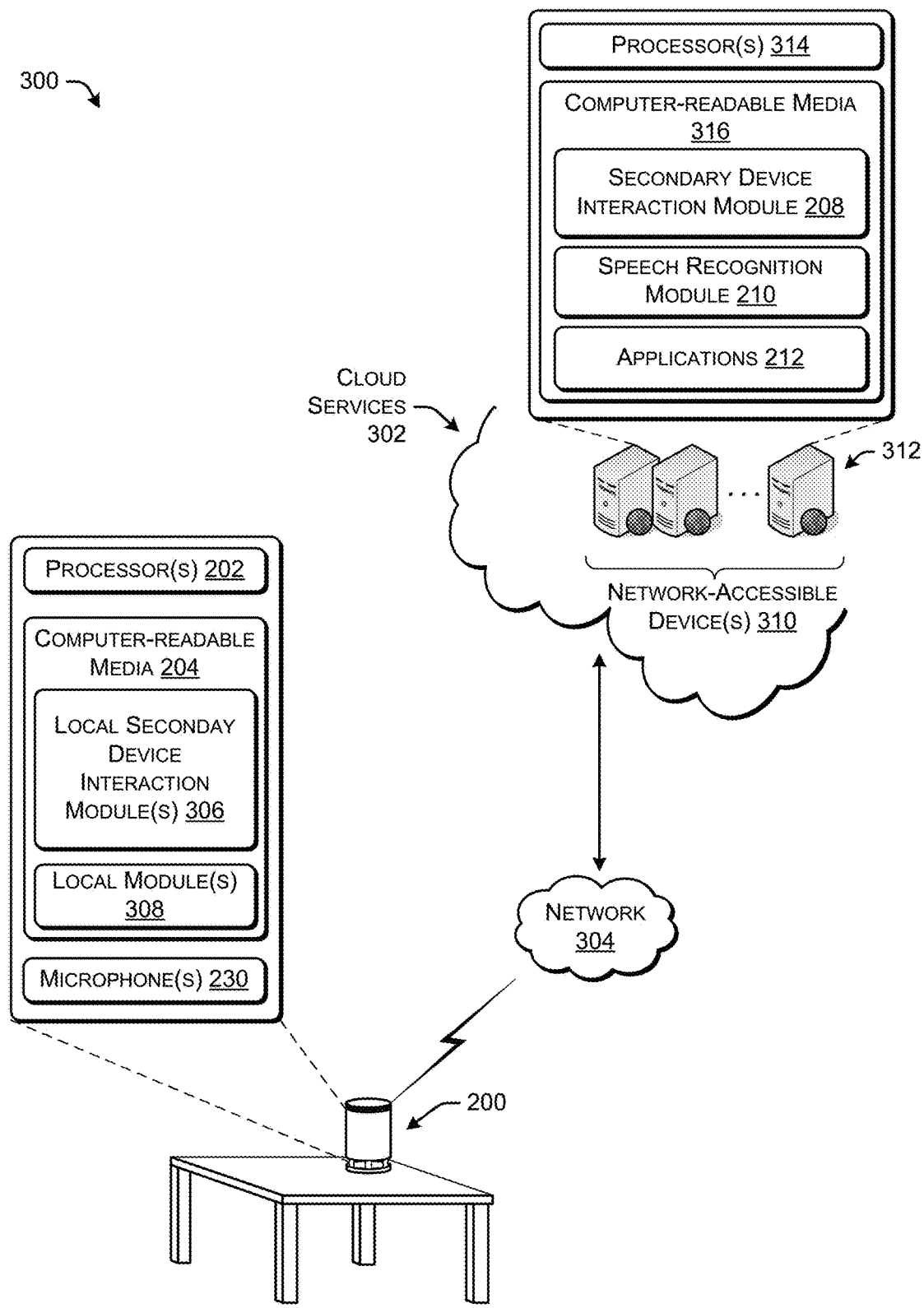
FIG. 3 shows a functional block diagram of selected components implemented at remote cloud services accessible via a network.

FIG. 3 illustrates an example architecture 300 showing an alternative implementation of the device 200 in which some or all of the functional components of the device 200 may be provided by cloud services 302. The cloud services 302 generally refer to a network accessible platform implemented as a computing infrastructure of processors, storage, software, data access, and so forth that is maintained and accessible via a network 304 such as the Internet. Cloud services 302 may not require end-user knowledge of the physical location and configuration of the system that delivers the services. Common expressions associated with cloud services include "on-demand computing", "software as a service (SaaS)", "platform computing", "network accessible platform", and so forth.

In this implementation, the device 200 may be configured with one or more local secondary device interaction module(s) 306 and one or more local modules 308 available in the computer-readable media 204 that provide instructions to the processor(s) 202. The one or more local secondary device interaction module(s) 306 may perform functions on behalf of or in response to instructions from the remote cloud services 302 relating to one or more of discovery, pairing and configuration of secondary devices 106. For example, in some implementations according to FIG. 3, the processing of natural language input data including the custom or user-specific secondary device names or commands may be performed by the remote cloud services 302. As will be discussed in more detail below, in such implementations, the module(s) 306 may operate to perform the on-device operations and interactions to allow the cloud services 302 to perform those tasks (e.g., causing the device 200 to output control signals, record natural language input data, and so on). The local modules 308 may provide basic functionality such as creating a connection to the network 304 and initial processing of data received from the microphone(s) 230 and controlling output device(s) such as speaker(s) 232. Other functionality associated with the device and system described in FIGS. 1 and 2 may be provided by the remote cloud services 302.

The cloud services 302 include one or more network-accessible devices 310, such as servers 312. The servers 312 may include one or more processors 314 and computer-readable media 316. The processor(s) 314 and the computer-readable media 212 of the servers 210 are physically separate from the processor(s) 202 and computer-readable media 204 of the device 200, but may function jointly as part of a system that provides processing and memory in part on the device 200 and in part on the cloud services 302. These servers 312 may be arranged in any number of ways, such as server farms, stacks, and the like that are commonly used in data centers.

Furthermore, in some implementations, at least part of the secondary device interaction module 208, the speech processing module 210 and/or any of the applications 212 shown in FIG. 1 may be located in the computer-readable media 316 of the cloud services 302. Thus, the specific location of the respective modules used to implement the features contained in this disclosure is not limited and the discussions below are equally applicable to any implementation that includes a local device, a cloud-based service, or combinations thereof. For example, the distribution of functionality between the local secondary device interaction module(s) 306 and the secondary device interaction module(s) 208 of the cloud services 302 may vary from implementation to implementation such that different amounts of processing may be performed on the voice controlled device 200 (e.g., based on the capabilities of the particular implementation of the voice controlled device 200). In another example of balancing the distribution of processing between the voice controlled device 200 and the cloud services 302, in implementations in which the speech processing module 210 is located in the computer-readable media 316 of the cloud services 302, the local secondary device interaction module(s) 308 and/or the local module(s) 308 may provide the functionality to recognize names and commands with regard to secondary devices and either process the command generation locally or provide the remote speech processing module 210 with additional information as a starting point.

In general, in implementations in which the voice controlled device 200 allows for a user to define or select a custom or user specific name for the secondary device or a custom command (as opposed implementations in which names and commands are predefined or otherwise not user selectable), the voice controlled device 200 may prompt the user for a custom or user specific name for the secondary device or a custom or user specific command format. The local module(s) 308 may operate the microphone(s) 230 to capture the user's response as audio data. The local secondary device interaction module(s) 308 may forward the audio data to the cloud services 302 along with an identification of the user, the secondary device and/or an instruction to link to the audio data. The secondary device interaction module(s) 208 and/or the speech processing module 210 of the servers 312 may evaluate and/or process the audio data of the user's response to generate data that may be used in recognizing the name or command. The secondary device interaction module(s) 208 of the servers 312 may then store the derived data for use in recognizing the name or command and issuing the corresponding instruction to be sent to the secondary device. For example, the data for use in recognizing the names or commands associated with the secondary device may be stored in a hash table or other such storage with a link to the user's profile and, in the case of a custom command, one or more instructions to be issued to secondary device(s) when the command is recognized.

Figure 4:
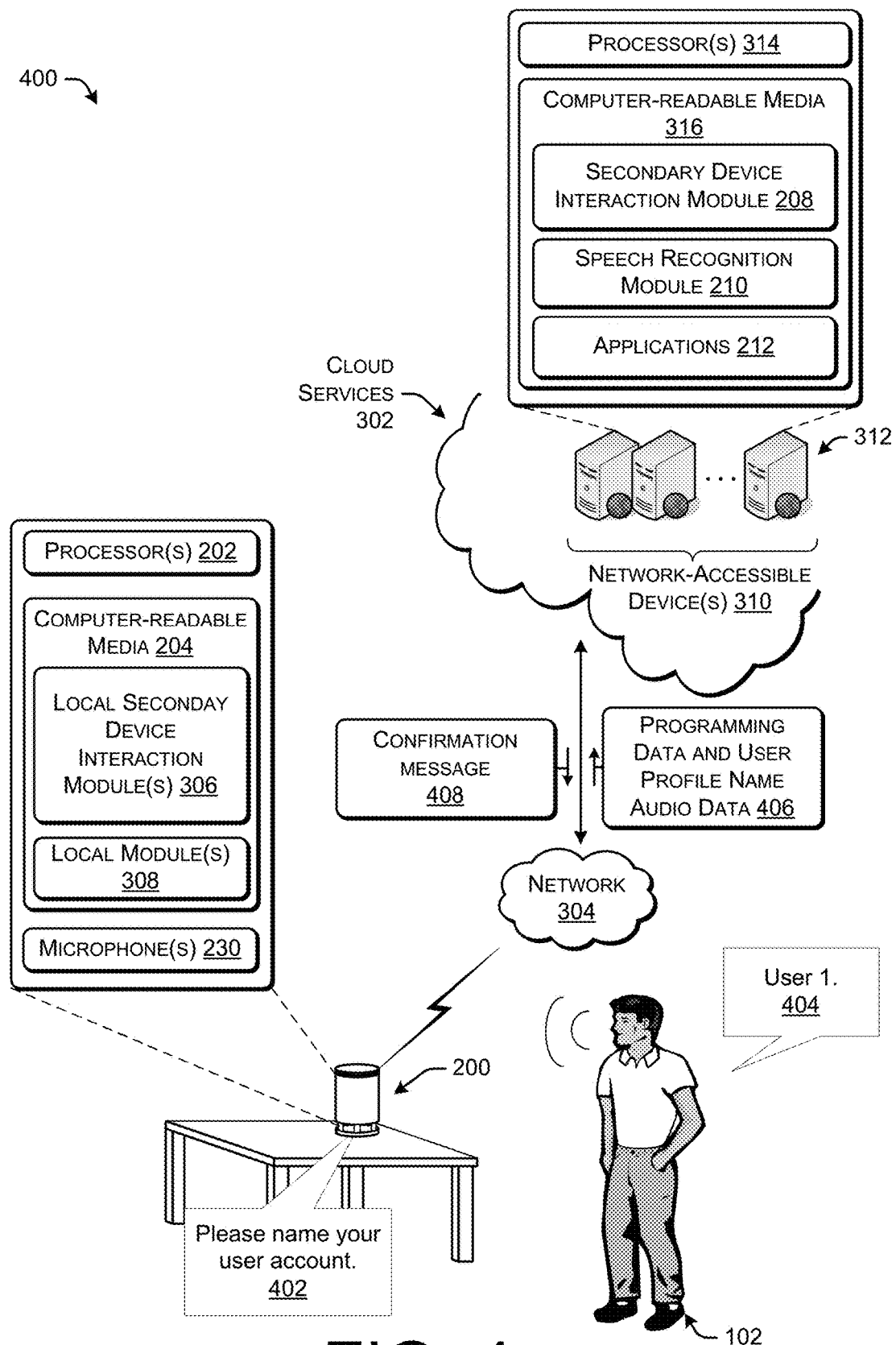
FIGS. 4-9 shows example operations within the architecture of FIG. 3 to configure a voice controlled device, discover a secondary device, pair the voice controlled device with the secondary device, and configure the voice controlled device to issue instructions, commands, or controls to the secondary device based on voice input from a user.
Figure 8:
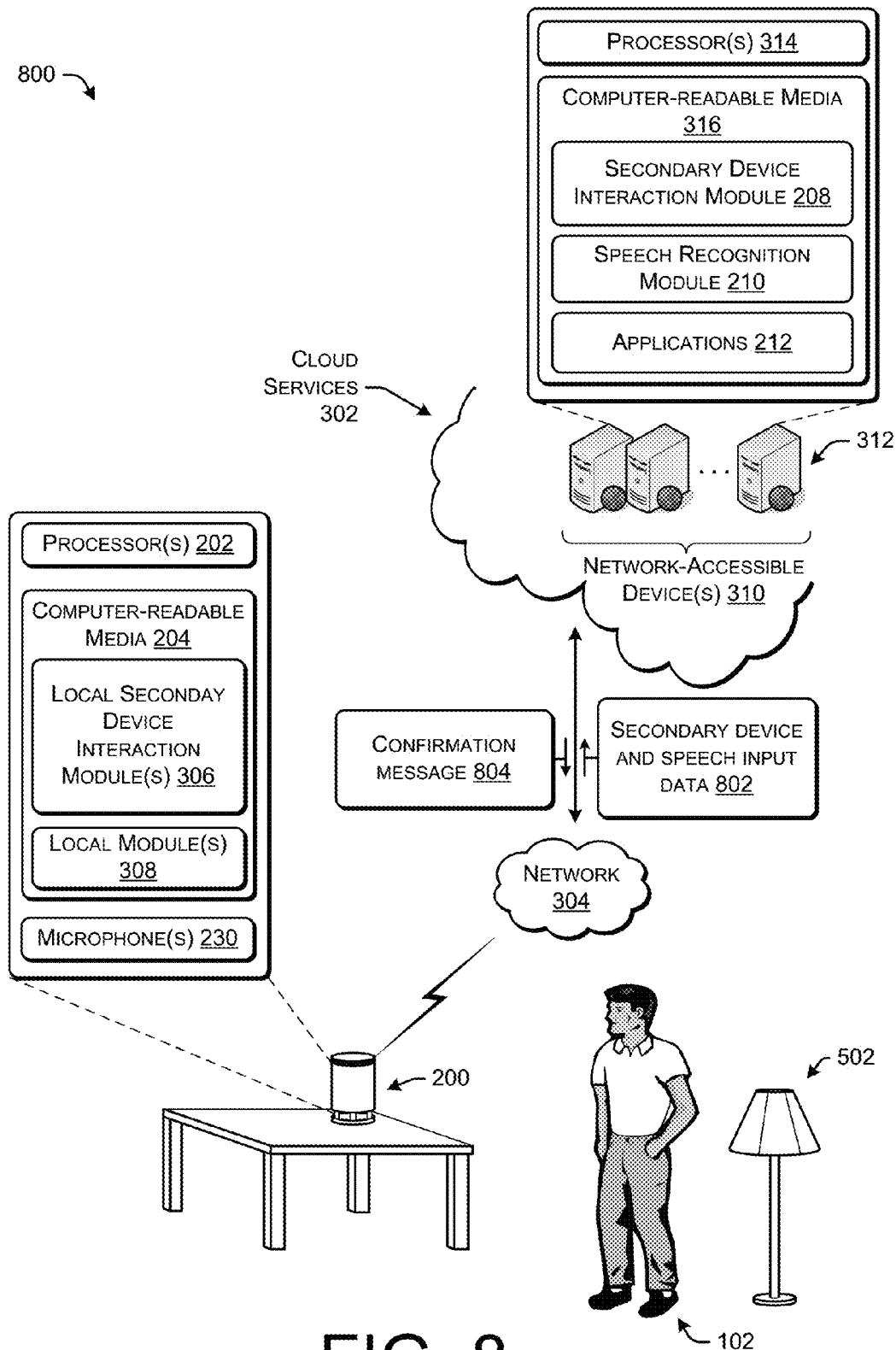
Figure 9:
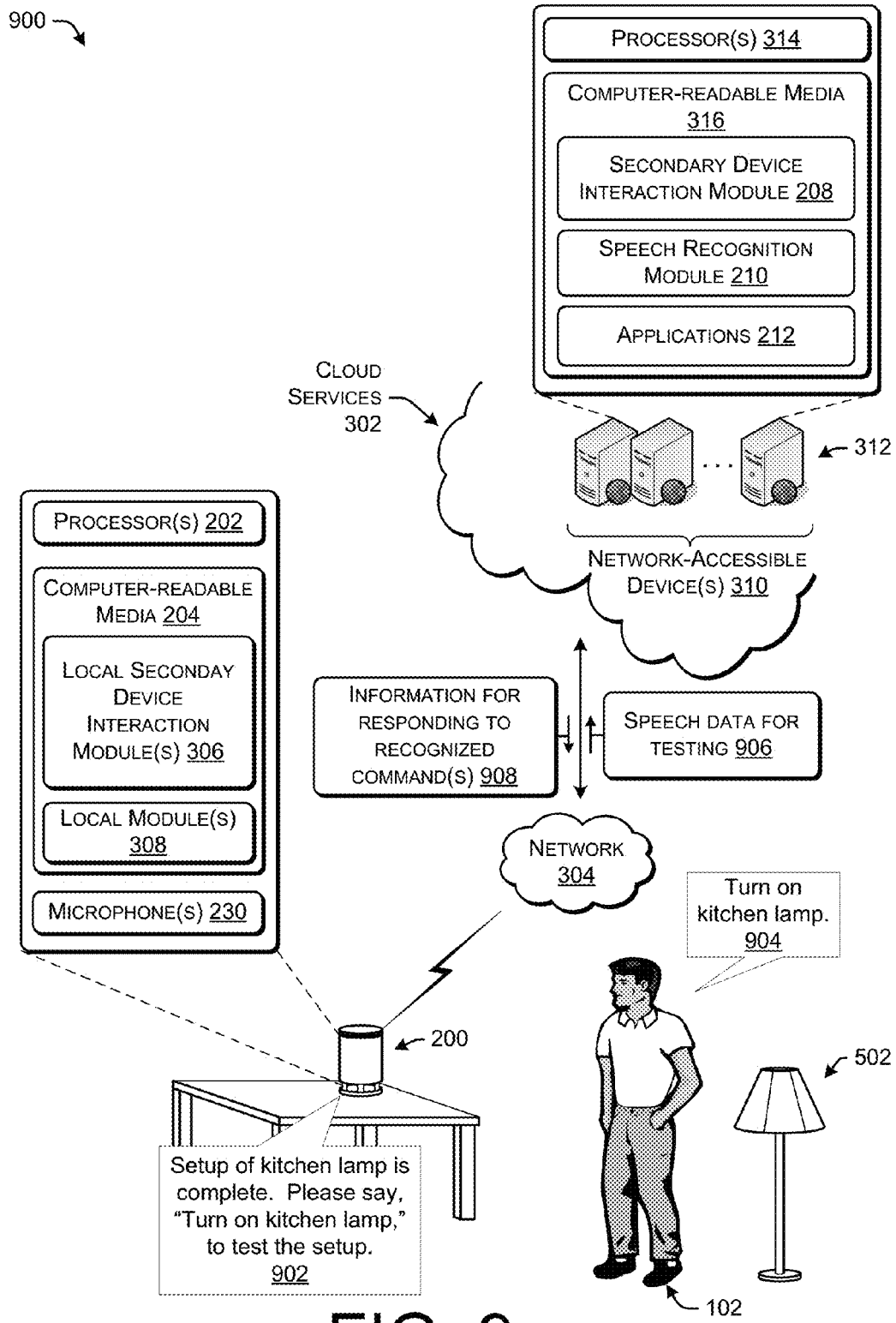
Figure 10:
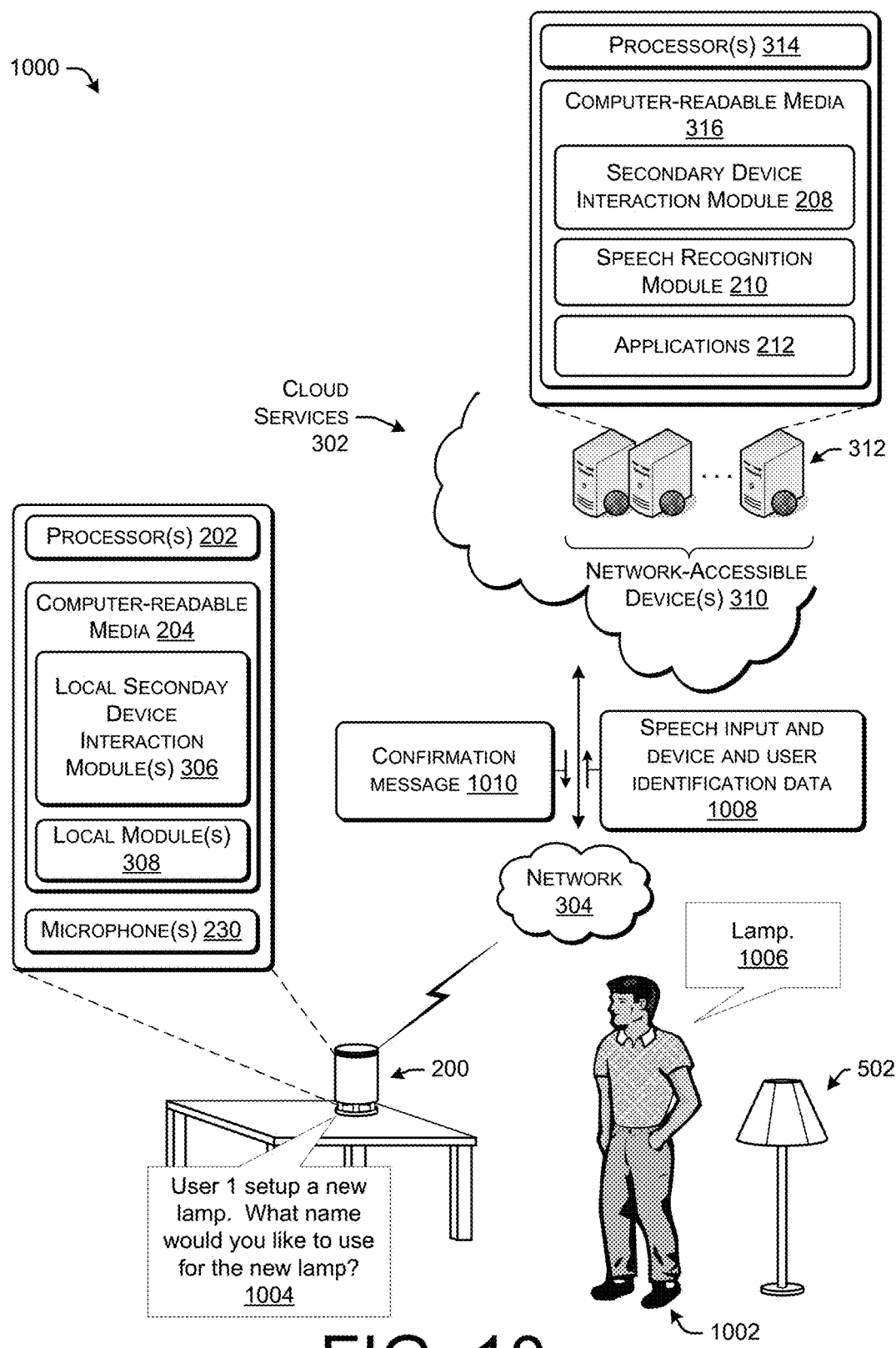
FIG. 10 shows example operations within the architecture of FIG. 3 to configure the voice controlled device to issue instructions, commands or controls to the secondary device based on voice input from an additional user.

FIGS. 4-10 illustrate the operation of an implementation in the example architecture 300 described above with regard to FIG. 3 and includes the voice controlled device 200 and the cloud services 302. In particular, FIG. 4 illustrates example operations of a stage 400 in which the user establishes a user account or profile (hereinafter user account) for a user 102. FIGS. 5-9 illustrate example stages 500-900 with operations to discover a secondary device, pair the voice controlled device 200 with the secondary device, and establish voice controls for user 102. FIG. 10 illustrates example operations of a stage 1000 by which a second user may establish voice control of the secondary device for the second user.

FIG. 4 shows an example scenario 400 in which the user 102 is setting up a user account with the voice controlled device 200 and the cloud services 302. It is assumed that the voice controlled device 200 has power and has connected to the cloud services 302 via the network 304 (e.g., through a Wi-Fi or other local area network connected to the Internet). In some implementations, following an initial power up and connection with the cloud services 302, the voice controlled device 200 may initiate an interaction with user 102 to setup a user account. Additionally or alternatively, the user 102 may push a button on the voice controlled device 200 to initiate the process (e.g. a button located on the bottom of the voice controlled device 200). Of course, these are merely examples and any number of interactions may be utilized to initiate the setup process.

Once the process is initiated, the voice controlled device 200 may request a name for the user account. For example, the voice controlled device 200 may output a phrase 402 "Please name your user account." The voice controlled device 200 may then detect and record audio data of the user's response 404, "User 1." The recorded audio data may then be sent to the cloud services 302 along with additional information—such as an identification of the voice controlled device 200, an identifier for the group of users of the voice controlled device 200, and so on—as programming data and user profile name audio data 406.

The servers 312 of the cloud service 302 may utilize the data 406 to setup an account for the user 102. Such an account may be linked to or include user profile information such as speech recognition data, secondary device names chosen by the user 102, and other customizations. Further, the user account may be linked to a device record that connects the user accounts of the users to the voice controlled device 200. As mentioned above, there may also be household or default names that may be used by any of the users of the voice controlled device 200. This data may be linked to or stored in such a device account. Once the user account setup (and other information setup) is complete, the cloud services may issue a confirmation message 408 to the voice controlled device 200. In some implementations, the voice controlled device 200 may output an indication that the setup process was successful (not shown).

The above setup process is an example and not meant to be taken as limiting on the implementations of the techniques and systems disclosed herein.

As mentioned above, FIGS. 5-9 illustrate operations of the voice controlled device 200 and the cloud services 302 including interacting with the user 102 to configure the voice controlled device 200 and the cloud services 302 to control a secondary device based on voice input to the voice controlled device 200. Each of FIGS. 5-9 illustrates a stage in the interaction.

Figure 5:
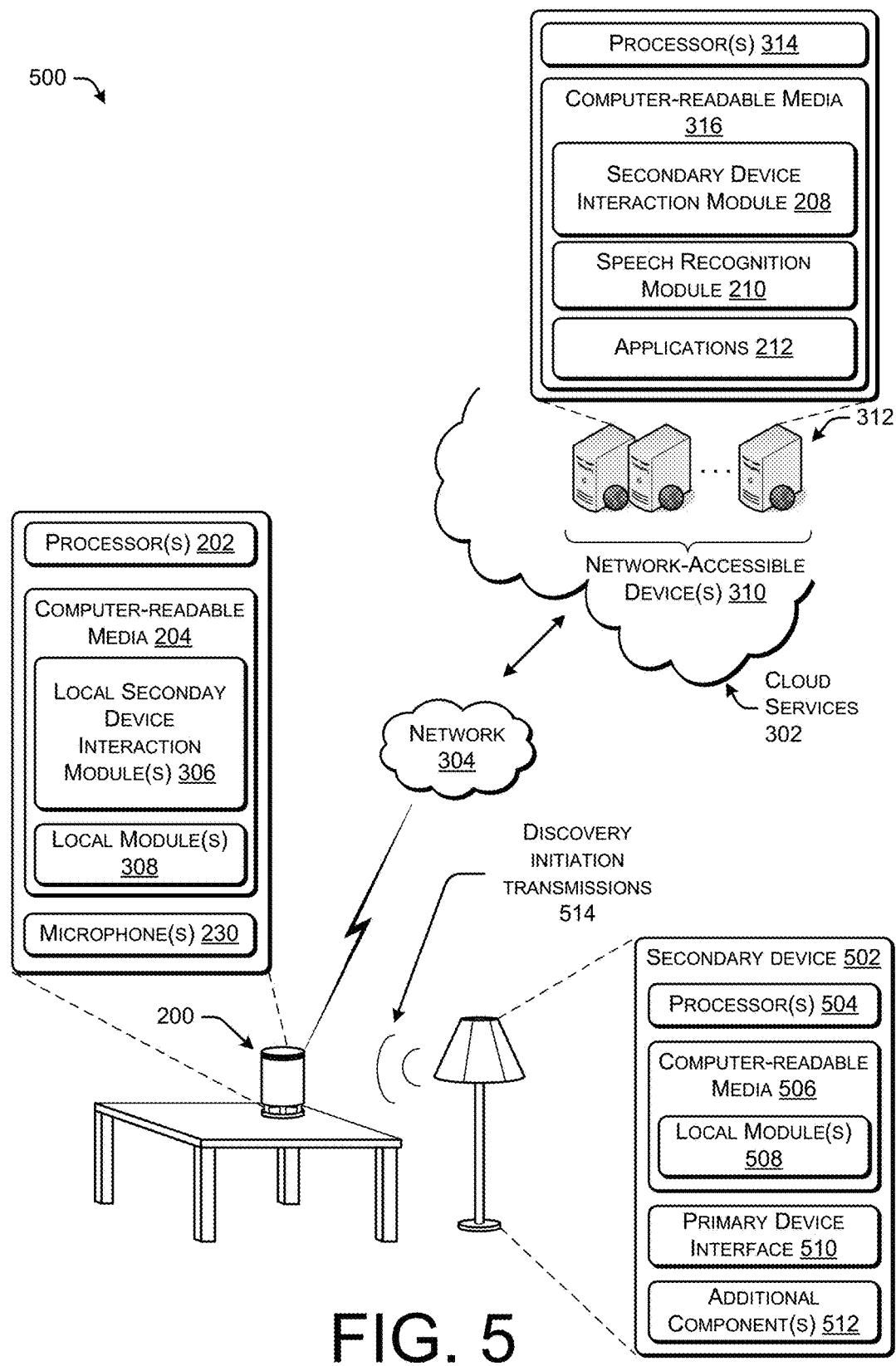

FIG. 5 illustrates the example architecture 300 at a stage 500 in the interaction that begins with the user 102 powering on the secondary device 502 that is to be controlled through voice input to the voice controlled device 200. In the example of FIG. 5, the secondary device 502 is illustrated as a floor lamp but this is not meant to imply any limitation on the type, form, function, or any other aspect of the secondary devices according to the systems and techniques disclosed herein.

In some implementations, the secondary device 502 may include one or more processors 504 and computer-readable media 506. In general, the one or more processors 504 and computer-readable media 506 are separate from the one or more processors 202, computer-readable media 204, one or more processors 314 and computer-readable media 316 but may be of similar or dissimilar types and/or configurations as described above regarding FIGS. 2 and 3.

The computer readable media 506 may store one or more local modules 508 that perform at least some of the various functions of the secondary device 502. For example, in some implementations, the local modules 508 may include instructions for causing the primary device interface 510 to interact with the voice controlled device 200 and/or other primary devices to perform other functions (e.g., functions requested by the voice controlled device 200).

The secondary device 502 may also include additional components 512 related to other functions of the secondary device 502. For example, the secondary device 502 shown in FIG. 5 is illustrated as a lamp. In such an implementation, the secondary device 502 may include additional components 512 for turning the light bulb on/off in response to interactions with the voice controlled device 200. Of course, the implementation illustrated in FIG. 5 is merely an example and many variations on the secondary device 502 are possible.

In the illustrated implementation, following the powering of the secondary device 502, the secondary device 502 begins outputting discovery initiation transmissions 514. The discovery initiation transmissions 514 may indicate to devices in an area proximate the secondary device 502 that the secondary device 502 is present and may be paired for external control by another device. For example, the discovery initiation transmissions 514 may include information used by the voice controlled device 200 to communicate with the secondary device 502. The voice controlled device 200 receives the discovery initiation transmissions 514 and the receipt of the discovery initiation transmissions 514 leads to the next step in the interaction and further interactions are described below with regard to FIGS. 6.

Figure 6:
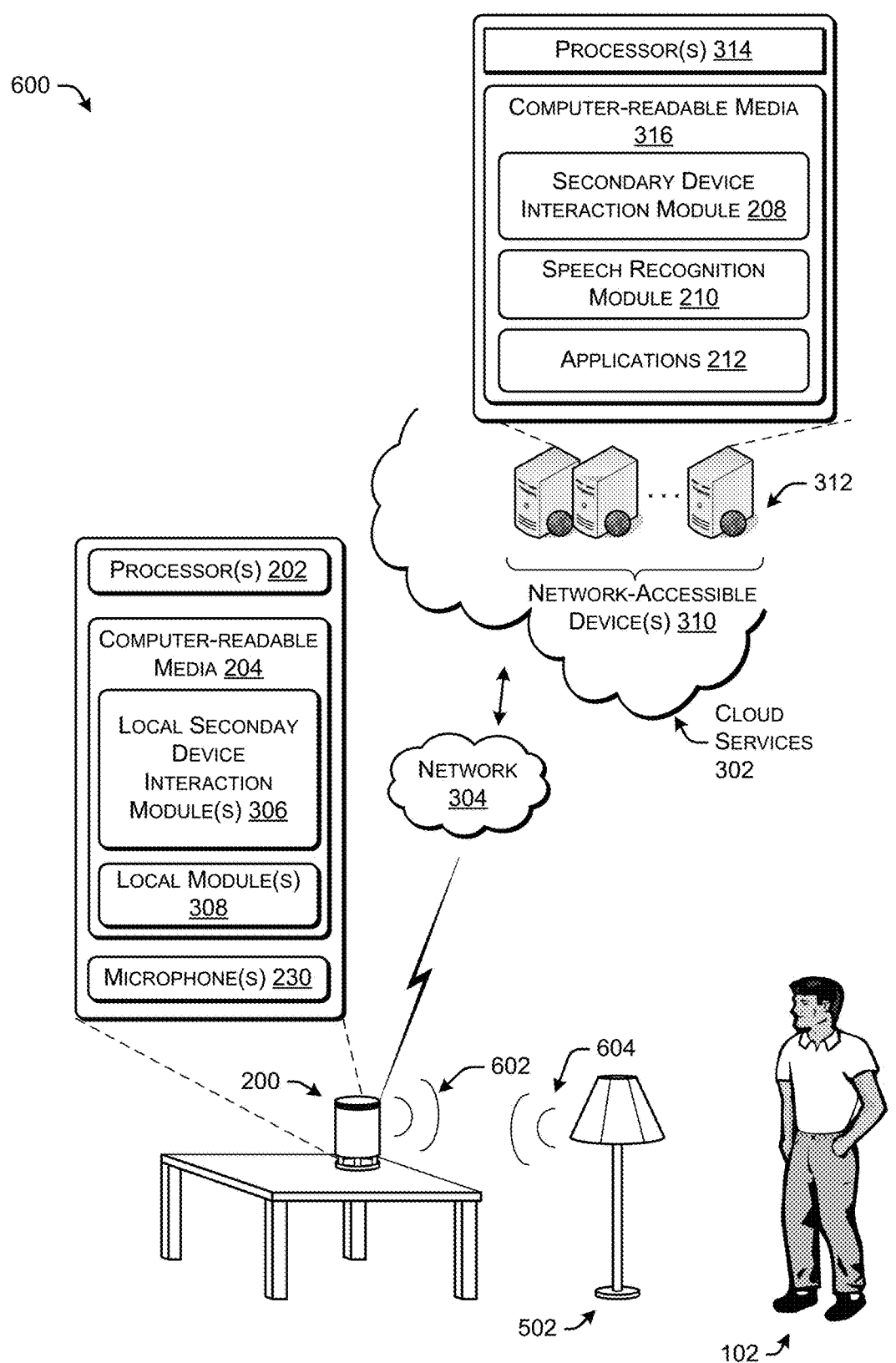

FIG. 6 illustrates the example architecture 300 at a stage 600 in the interaction following the receipt of the discovery initiation transmissions 514 by the voice controlled device 200.

Figure 7:
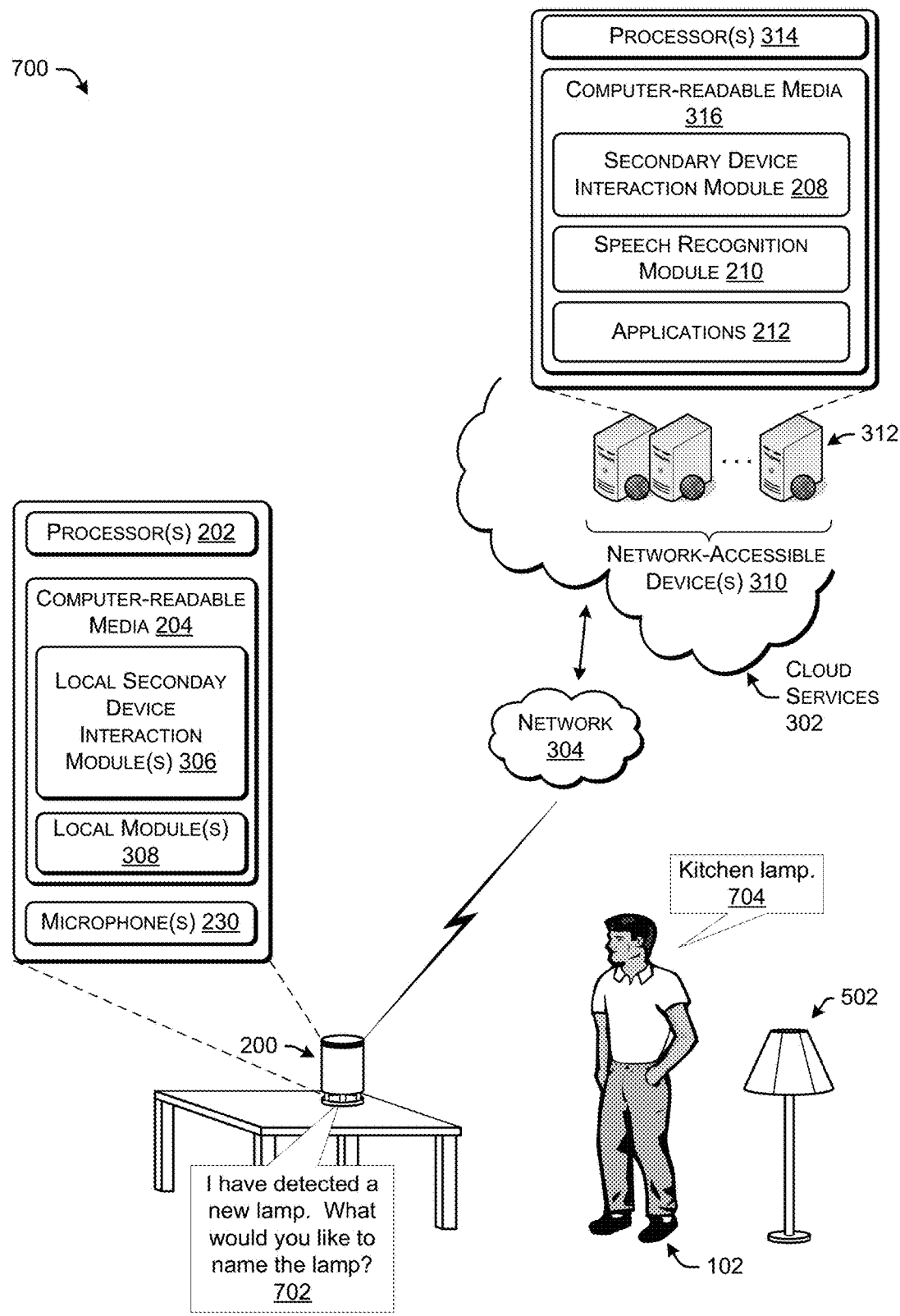

At this stage 600, the voice controlled device 200 transmits a request 602 for additional information regarding the secondary device 502 to allow the voice controlled device 200 to control the secondary device 502. In response, the secondary device 502 transmits a reply 604 including the requested information about the secondary device and/or control information used by the voice controlled device 200 to control the secondary device 502. At this point, in the illustrated implementation, the voice controlled device 200 and the secondary device 502 are paired for the purpose of wireless communication and control of the secondary device 502 by the voice controlled device 200. FIGS. 7-9 illustrate stages of the configuration process of the voice controlled device 200 and the cloud services 302 for the voice control of the secondary device 502 through the voice controlled device 200.

The discovery and pairing sequence described above with regard to FIGS. 5 and 6 is merely an example and many variations are possible. Some example variations are provided below.

In some implementations, the discovery process may be initiated on the voice controlled device 200. For example, the user may push a button on the voice controlled device 200 or speak a phrase to initiate discovery of new secondary devices (e.g., in an area proximate the voice controlled device 200). For example, user 102 may utter the phrase, "Search for new devices" to begin the discovery process.

The process discussed with regard to FIGS. 5 and 6 includes the voice controlled device 200 automatically pairing to the secondary device 502 upon receiving additional information from the secondary device 502. Additionally or alternatively, the voice controlled device 200 may request user approval or confirmation prior to completing the pairing to the secondary device 502. For example, the voice controlled device 200 may output the phrase, "I have detected a new lamp. Would you like me to pair with the new lamp?" If the user replies in the affirmative, the voice controlled device 200 of such implementations could complete the pairing process (e.g., by exchanging additional communications with the secondary device 502).

Another example type of variation may relate to the discovery and pairing process in general. Such differences in the discovery and pairing process may be due to different communication protocols which may have different pairing processes. For example, some devices may communicate with a server to discover new devices (e.g., by using HTTP or a restful API). Other devices may scan a known address range or scan or listen on known communication channel(s). Some example communication protocols include Zigbee™, Z-Wave™, Bluetooth™, Wi-Fi™, Wi-Fi Direct™, and Insteon™. Each of these and other protocols have specified discovery and pairing processes. As would be understood by one of ordinary skill in the art in view of this disclosure, the process provided above with regard to FIGS. 5 and 6 may be adapted to account for the discovery and pairing process entailed by the communication protocol used for communication between the voice controlled device 200 and the secondary device 502.

Additional information may be exchanged between the voice controlled device 200 and the secondary device 502 at this stage or other stages. For example, in a case in which the secondary device 502 is to be connected to a home network of the user, the voice controlled device 200 may provide the secondary device 502 with connection information to allow the secondary device 502 to connect to the home network without the user having to manually provide such details (e.g., the voice controlled device 200 may provide Wi-Fi network identification and security information to the secondary device 502 in lieu of the user providing this information manually). Another example may be illustrated with regard to an implementation in which the pairing and normal communication of the devices 200 and 502 is through the home network. In some such implementations, the initial discovery initiation transmission may be output through a first protocol (e.g., Wi-Fi Direct) through which the voice controlled device 200 and the secondary device 502 exchange the home network details. Once the secondary device 502 has connected to the home network, the remainder of the pairing process and later interactions may be conducted using a second protocol (e.g. Wi-Fi) over the home network.

Further, the process discussed above with regard to FIGS. 5 and 6 includes a discussion of the voice controlled device 200 performing the discovery and the pairing process independent of the cloud services 302. However, in some implementations, the cloud services 302 may perform at least some of the discovery and/or pairing operations. In some such implementations, the local secondary device interaction module(s) 306 of the voice controlled device 200 may operate to detect discovery initiation transmissions from the secondary device 502 and relay the information to the cloud services 302. The cloud services 302 may perform the processing to carry out of the pairing process and instruct the voice controlled device 200 to communicate with the secondary device 502 on behalf of the cloud services 302. Other implementations may have different distributions of the operations between the voice controlled device 200 and the cloud services 302.

As alluded to above, FIG. 7 illustrates the example architecture 300 at a stage 700 in the interaction following the pairing of the voice controlled device 200 to the secondary device 502. In general, the stage 700 illustrates example operations to obtain the voice audio input data from the user 102 including a name for the secondary device 502 that the user 102 will use when issuing voice commands for the secondary device 502.

As illustrated in FIG. 7, the voice controlled device 200 may output a phrase prompting the user for a name for the secondary device 502. In particular, the voice controlled device 200 outputs the phrase 702, "I have detected a new lamp. What would you like to name the lamp?" In the illustrated example implementation, the voice controlled device 200 utilizes additional information included in the reply 604 to inform the user of the type of secondary device 502 that has been detected (i.e., a new lamp). In some implementations, the voice controlled device 200 may inform the user 102 that a secondary device has been detected without identifying the type of device. For example, the manufacturer of the secondary device 502 may not have included the capability for the secondary device 502 to inform the voice controlled device 200 of the type of the secondary device 502. In such a case, the voice controlled device 200 may output the phrase, "I have detected a new device. What would you like to name the new device?"

In response to the question 702 output by the voice controlled device 200, the user 102 may speak a name for the new secondary device 502. In the illustrated example, the user 102 replies with the phrase 704, "Kitchen lamp." In other words, the user 102 indicates that the user will refer to the secondary device 502 as "kitchen lamp" when interacting with the voice controlled device 200 to control the secondary device 502. This reply may be captured by the microphone(s) 230 of the voice controlled device 200 as speech input data.

FIG. 8 illustrates the example architecture 300 at a stage 800 in the interaction following the capture by the voice controlled device 200 of audio data corresponding to the user's reply 704. In general, the stage 800 illustrates example operations to provide the cloud services 302 with information relating to the secondary device 502 and the name for the secondary device 502 provided by the user 102. Using the provided information, the cloud services 302 may setup the user's profile for operation to control the secondary device 502 based on the name indicated by the user 102.

As shown in FIG. 8, the modules(s) 306 of the voice controlled device 200 may operate to send data related to the secondary device and the captured speech input data 802 to the cloud services 302. The cloud services 302 uses the data to set up the user's profile to allow for control of the secondary device 502 by the voice controlled device 200. In this manner, future speech output from the user 102 that includes a command and the user provided name (e.g., kitchen lamp) may be used to control the secondary device 502.

More specifically, upon receiving the data 802, one or more of the modules 208 or 210 may convert the speech input data of 802 into speech recognition data to be utilized by the speech processing module 210. The secondary device interaction module 208 may also operate to generate a secondary device record related to the user account of the user 102. Such a secondary device record may include information about the secondary device 502 as well as information related to the functions of the secondary device 502 to allow the cloud services 302 determine the possible controls that may be exercised by the voice controlled device 200. For example, the secondary device record for the lamp illustrated as the secondary device 502 may include:

(1) an identifier of the secondary device 502;
(2) a device type of the secondary device 502;
(3) a model and/or manufacturer of the secondary device 502;
(4) a list of names assigned to the secondary device 502 by the users of the voice controlled device 200 along with speech recognition data to allow the speech processing module 210 to recognize the names; and
(5) a list of functions of the secondary device 502 that may be controlled by the voice controlled device 200 along with speech recognition data to allow the speech processing module 210 to recognize the voice commands as well as any additional information needed to allow the cloud services to cause the voice controlled device 200 to output the command to the device 502 and a proper format for the secondary device 502.

Similar operations may be performed for any device account or household account as appropriate based on the particular implementation.

Once the secondary device 502 has been set up with the account of the user 102, the cloud services 302 may return a confirmation message 804 to the voice controlled device 200. The confirmation message 804 may cause the voice controlled device 200 to output an audio indication that the setup was completed (see FIG. 9) and/or may cause the voice controlled device 200 to conduct any additional communications with the secondary device 502 as necessary to complete the pairing process (i.e., in implementations in which the process was not completed previously).

FIG. 9 illustrates the example architecture 300 at a stage 900 in the interaction following the receipt of the confirmation message 804 by the voice controlled device 200. In general, the stage 900 shown in FIG. 9 illustrates example operations to verify the configuration of the voice controlled device 200 and the cloud services 302 to control the secondary device 502 based on speech input from the user 102.

As shown in FIG. 9, following receipt of the confirmation message 804, the voice controlled device 200 outputs a confirmation that the setup is complete and requests the user 102 test the secondary device controls. In particular, the voice controlled device 200 outputs the phrase 902, "Set up of kitchen lamp is complete. Please say, 'Turn on kitchen lamp,' to test the setup." In the illustrated example of FIG. 9, the user 102 complies with the request and speaks the phrase 904, "Turn on kitchen lamp." The microphone(s) 230 of the voice controlled device 200 capture the speech 904 as speech data for testing 906. The local secondary device interaction module(s) 306 of the voice controlled device 200 may operate to send the speech data for testing 906 to the cloud services 302. Depending on the implementation, the voice controlled device 200 may or may not include an indication to the cloud services 302 that the speech data 906 is for testing purposes. In other words, in some implementations, the cloud services 302 may operate on the speech data for testing 906 in the same manner as speech data that is not for testing purposes. In other implementations, the cloud services 302 may be informed of the purpose of the data 906 and/or may perform processing in addition to the processing normally applied to generic speech input data.

Upon receiving the speech data for testing 906, the speech processing module 210 of the cloud services 302 may operate to perform speech recognition and attempt to match the speech data for testing 906 to a command associated with a secondary device 502 associated with the user account, where the name of the secondary device is in the proper context of the command. For example, a command format for turning on the secondary device 502 may take the form of "Turn on [assigned name]" where, for the command to be recognized, the text "[assigned name]" is replaced with the name provided by the user 102 for the secondary device 502. Thus, the speech data for testing 906 including the phrase 904, "Turn on kitchen lamp" is matched to the turn on command of the secondary device 502 (i.e. the secondary device named "kitchen lamp"). If a match is found, the cloud services 302 may operate to determine the instruction that the voice controlled device 200 should issue to the secondary device 502 to implement the recognized command. This information may be provided to the voice controlled device 200 as illustrated information for responding to recognized command(s) 908.

Upon receiving the information for responding to recognized command(s) 908, the voice controlled device 200 may utilize the information 908 to issue the proper instructions to the secondary device 502 to implement the recognized command(s) (i.e., to turn on the secondary device 502).

FIG. 10 illustrates the example architecture 300 in a scenario 1000 in which the voice controlled device 200 is set up to control the secondary device 502 for an additional user 1002. For example, the additional user 1002 may be a member of the household of user 102 and have a user account already set up with the voice controlled device 200 and the cloud services 302. After the user 102 has set up and configured the secondary device 502 for operation with the voice controlled device 200, the voice controlled device 200 may prompt the user 1002 to provide setup information for the secondary device 502 on the next occasion the user 1002 interacts with the voice controlled device 200.

As shown in FIG. 10, when the user 1002 begins interacting with or is detected by the voice controlled device 200, the voice controlled device 200 may output a phrase 1004 such as, "User 1 set up a new lamp. What name would you like to use for the new lamp?" In response, the user 1002 provides a reply 1006 of "Lamp." The user's reply 1006 may be captured by the microphone(s) 230 of the voice controlled device 200 in the form of speech input data.

The speech input data and device information identifying the secondary device 502 may be sent by the voice controlled device 200 to the cloud services 302 in the form of a message 1008. The device information identifying the secondary device may be used to locate the device record and/or user account of the user 1002. Once the records are located, the speech input data may be utilized to generate speech recognition data to recognize the name assigned to the secondary device 502 by the user 1002. Similar to the setup of a first user, a confirmation message 1010 may be returned to the voice controlled device 200 and the voice controlled device 200 may inform the user of the success.

The techniques illustrated in FIGS. 4-10 for configuring a voice controlled device 200 and cloud service 302 to control a secondary device 502 based on speech data from a user 102 are merely representative and are not intended to cover a comprehensive list, nor be limiting in any manner. These and other possible particular techniques for implementing the configuring a voice controlled device 200 and cloud service 302 to control a secondary device 502 based on speech data from a user 102 may be used and the implementations are not limited to any particular technique.

Figure 11:
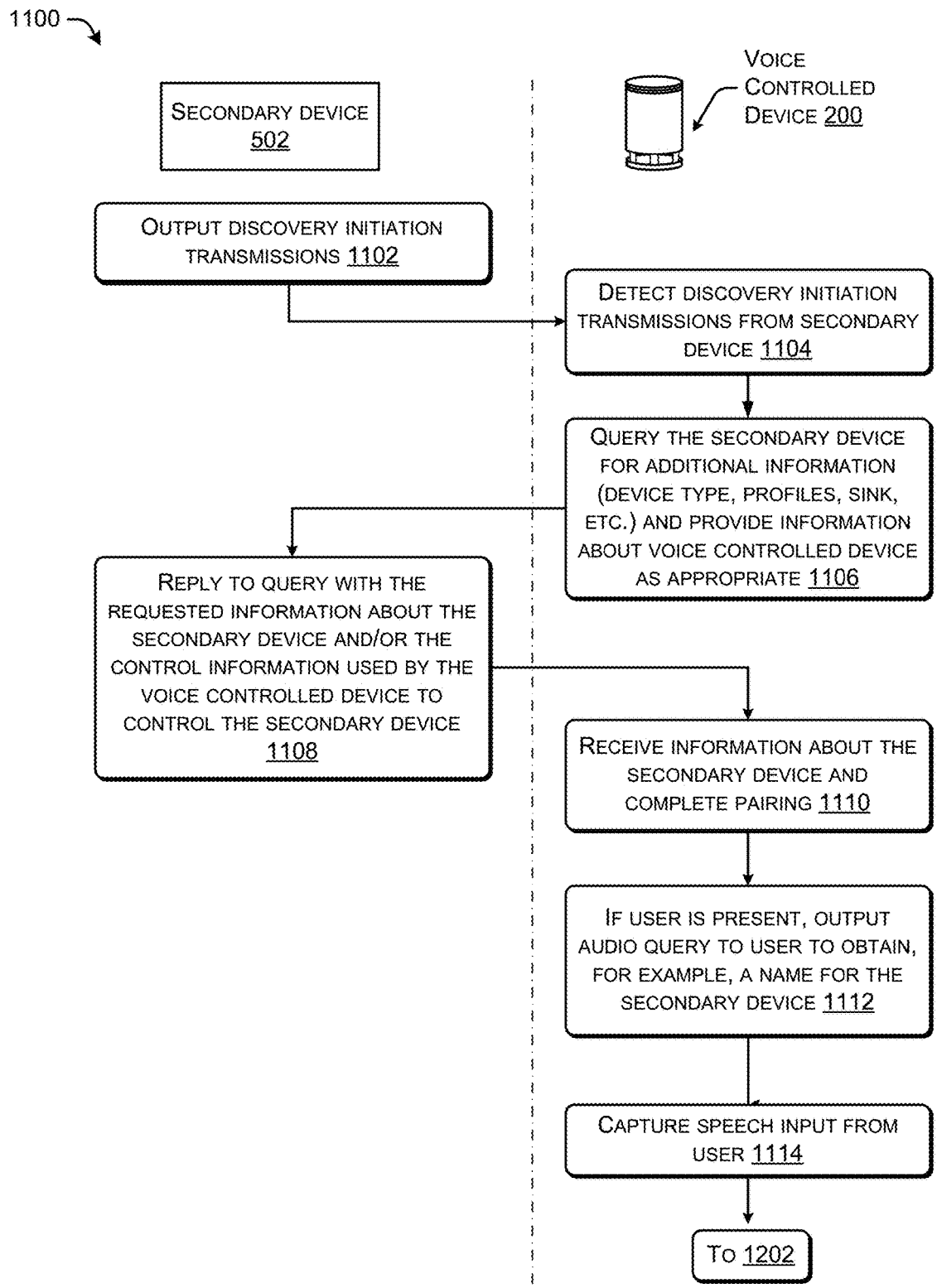
FIGS. 11-12 shows an example process for discovering a secondary device, pairing a voice controlled device with the secondary device and configuring the voice controlled device to issue instructions, commands or controls to the secondary device based on voice input from a user.
Figure 12:
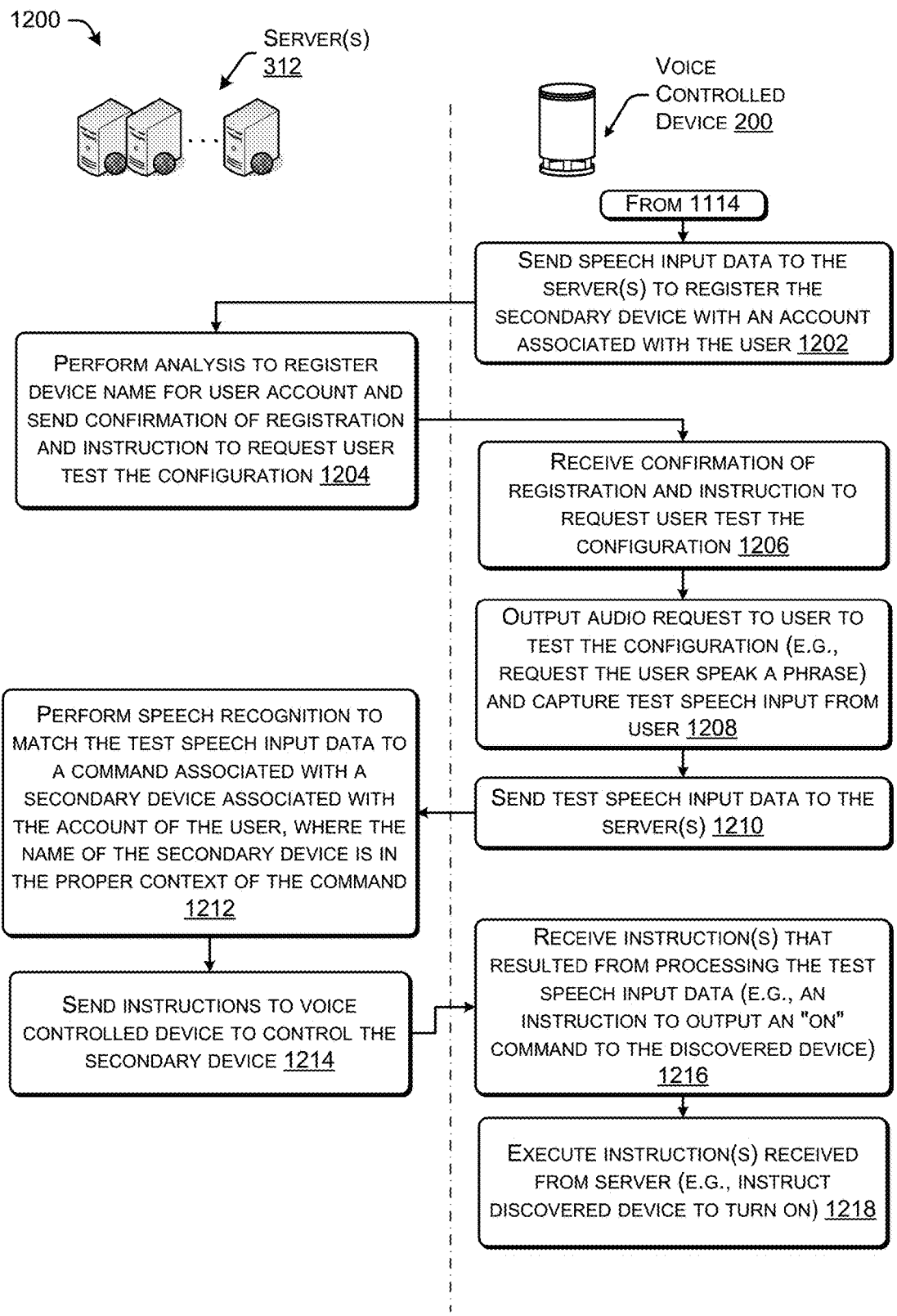

FIGS. 11 and 12 shows an example process 1100 and 1200 for performing the discovery, pairing, and configuration of a voice controlled device 200 and cloud service 302 to control a secondary device 502 based on voice input from a user. The processes 1100 and 1200 may be implemented by the voice controlled device 200 and server(s) 312 of FIG. 3, or by other devices. This process is illustrated as a collection of blocks or actions in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

For purposes of describing one example implementation, the blocks are arranged visually in FIGS. 11-12 in columns beneath the voice controlled device 200, the secondary device 502 and server(s) 312 to illustrate that these devices of the system 300 may perform these operations. That is, actions defined by blocks arranged beneath the voice controlled device 200 may be performed by the voice controlled device 200, and similarly, actions defined by blocks arranged beneath the secondary device 502 and server(s) 312 may be performed by the secondary device 502 and one or more of the server(s) 312, respectively.

At 1102, the secondary device 502 may begin outputting discovery initiation transmissions. As discussed above with regard to FIG. 5, such discovery initiation transmissions may indicate to devices in an area proximate the secondary device 502 that the secondary device 502 is present and may be paired for external control by another device.

At 1104, the voice controlled device 200 may detect the discovery initiation transmissions from the secondary device 502. At 1106, the voice controlled device 200 may query the secondary device for additional information (e.g. device type, profiles, sink, etc.) and provide information about voice controlled device 200, as appropriate to the implementation. As mentioned above, additional and/or other information may be provided to the secondary device 502 as well. For example, information may be provided to enable the secondary device 502 to connect to a network (e.g., a home network of the user).

At 1108, the secondary device 502 transmits a reply including the requested information about the secondary device and/or the control information used by the voice controlled device 200 to control the secondary device 502. At 1110, the voice controlled device 200 receives the reply from the secondary device 502 and processes the information to complete the pairing process.

At 1112, when the voice controlled device 200 detects that the user 102 is present, the voice controlled device 200 outputs an audio query to the user 102 to obtain, for example, a name for the secondary device 502. At 1114, the voice controlled device 200 captures speech input at the microphone(s) 230. The process then continues in FIG. 12 at 1202.

At 1202, the voice controlled device 200 sends the speech input data (and other information as appropriate) to the server(s) 312 to register the secondary device 502 with an account associated with the user. At 1204, the server(s) 312 perform an analysis to register the device with the account of the user and processes the speech input data into speech recognition data that may be used by the speech processing module(s) 210 to recognize the name assigned to the device by the user. The server(s) 312 may then send a confirmation of the registration to the voice controlled device 200 along with an instruction to the voice controlled device 200 to request the user 102 test the configuration.

At 1206, the voice controlled device 200 may receive the confirmation of the registration and the instruction to request the user 102 test the configuration. At 1208, the voice controlled device 200 may output an audio request to user 102 to test the configuration (e.g., request the user speak a phrase corresponding to a command and including the name assigned to the secondary device) and capture test speech input from user 102. At 1210, the voice controlled device 200 may send the captured test speech input data to the server(s) 312.

At 1212, the server(s) may perform speech recognition on the test speech input data in view of the speech recognition data previously generated for the name assigned to the secondary device to match the test speech input data to a command associated with a secondary device 502 associated with the account of the user, where the name of the secondary device is in the proper context of the command. As mentioned above, the speech recognition may be performed using any number of conventional speech recognition techniques such as use of hidden Markov models, Gaussian mixture model, natural language processing and/or extensive lexicons to interpret the voice input.

At 1214, the server(s) may return the instruction(s) to the voice controlled device 200 to instruct the secondary device 502 to execute the recognized command or commands. At 1216, the voice controlled device 200 may receive the instruction(s) that resulted from the processing of the test speech input data (e.g., an instruction to output an "on" command to the discovered device).

At 1218, the voice controlled device 200 may execute the instruction(s) received from server(s) and issue the commands to the secondary device 502 (e.g., instruct the lamp device to turn on).

FIG. 13 shows an example process 1300 for performing the configuration of a voice controlled device 200 and cloud services 302 to control a secondary device 502 based on voice input from a second user (e.g. user 1002) after devices have been configured for user 102. Because the voice controlled device 200 and cloud services 302 are paired with or otherwise able to control the secondary device 502, the process may vary from that discussed above. The process 1300 may be implemented by the voice controlled device 200 and server(s) 312 of FIG. 3, or by other devices. For the purposes of brevity, it is assumed for FIG. 13 that the second user 1002 has an account with the voice controlled device 200 and server(s) 312 but is not configured to control the secondary device 502.

At 1302, the voice controlled device 200, upon interacting with an additional user or detecting the presence of the additional user, may determine that the additional user has not been configured to control the secondary device (e.g., a secondary device already set up by another user of the voice controlled device 200 such as user 102). At 1304, the voice controlled device 200 may output an audio query to the additional user indicating that a new secondary device was added by another user and asking what the user would like to call the secondary device.

The process may then continue with the previously discussed process of FIGS. 11-12 beginning at block 1114 and continuing to block 1216. Of course, some implementations will include at least some minor variations to account for the secondary device 502 already being registered with the cloud services 302. These and many other variations are possible.

Figure 14:
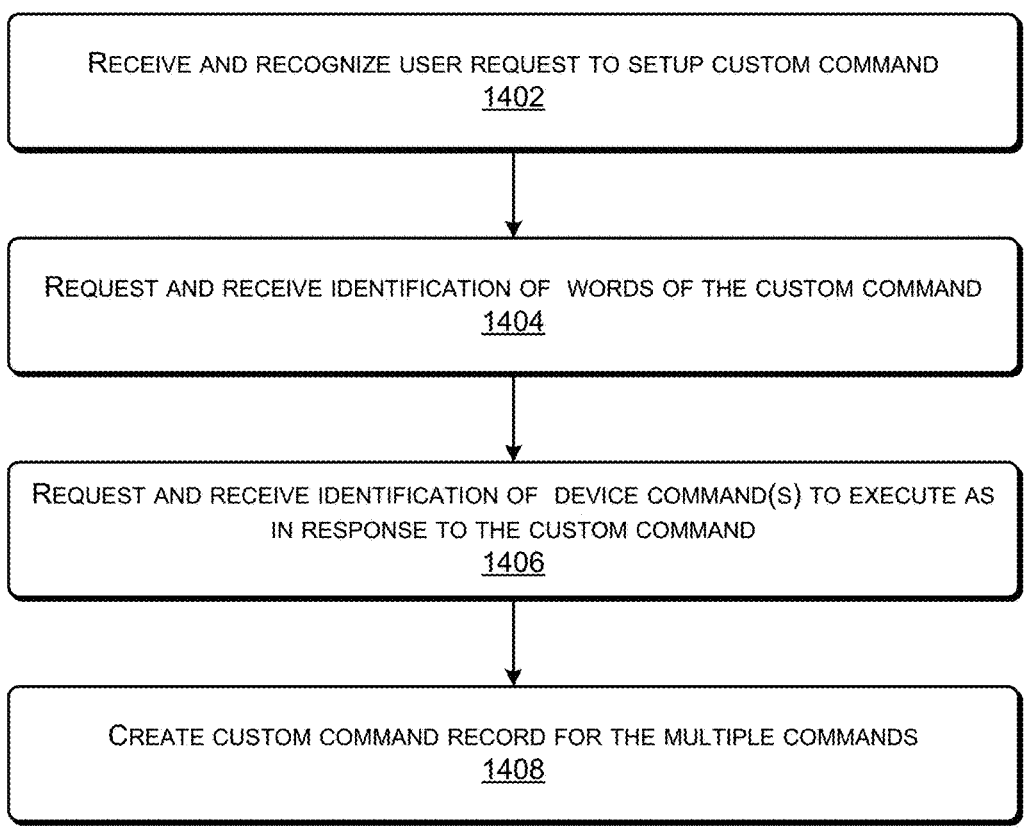
FIG. 14 shows an example process for configuring the voice controlled device to issue instructions, commands or controls to a plurality of secondary devices based on voice input from a user.

FIG. 14 shows an example process 1400 for performing the configuration of a voice controlled device 200 and cloud services 302 to control a plurality of secondary devices 502 based on voice input from a user 102. For example, in some implementations according to FIG. 14, a user 102 may setup a custom command to result in instructions being issued to a first secondary device and also one or more second secondary devices. As a more specific example, the user 102 may wish to create a custom command to activate a theater mode of the user's entertainment center (e.g., a television and a Blu-Ray player) and also cause window blinds to close on at least one window in the room in which the entertainment center is located. Of course, the techniques and systems disclosed herein should be understood to include no limit on the number of additional secondary devices that may be controlled with a single custom command. For example, in addition to the blinds, the custom command to activate the theater mode may also result in a change to the lighting, such as turning off or dimming the lights in the room.

At 1402, the voice controlled device 200 may receive and relay to the cloud services 302 request by the user 102 to setup a custom command. For example, the microphone(s) 230 of the voice controlled device 200 may capture a user statement of "Please set up a custom command." The speech processing modules 210 may operate to process and recognize the command.

At 1404, the cloud services 302 may instruct the voice controlled device 200 to request the user 102 identify the words of the command. For example, the voice controlled device 200 may output the phrase, "What are the words of your custom command?" The microphone(s) 230 may then capture the user's response as audio data and send the data to the cloud services for processing and recognition. For example, the user 102 may reply "Put my living room movie watching mode." Thus, the cloud services 302 may recognize that the command "Put my living room television in movie watching mode" is to execute user specified actions.

At 1406, the cloud services 302 may instruct the voice controlled device 200 to request the user 102 identify the device command(s) to be executed as part of the custom comment. For example, the voice controlled device 200 may output the phrase, "What is the first action you would like to occur when your living room is in movie watching mode?" The microphone(s) 230 may then capture the user's response as audio data and send the data to the cloud services for processing and recognition. For example, the user 102 may reply "Turn off living room lights." Thus, the cloud services 302 may recognize and add the command "Turn off living room lights" as a action to be executed in response to the custom command, "Put my living room television in movie watching mode." The cloud services 302 may instruct the voice controlled device 200 to ask if additional actions should be added to the custom command or if the user is finished.

At 1408, when the user indicates that the user is finished, the cloud services 302 may create the custom command record for "Put my living room in movie watching mode" to cause the specified action to be performed in conjunction with the custom command.

The discussion provided above of multiple actions being tied to a particular voice command is an example and is not intended to imply any limitation on the implementations of the techniques and systems disclosed herein. Many variations are possible and contemplated as within the scope of this disclosure. For example, in the example provided above with regard to FIG. 14, multiple device are executed in response a custom voice command. In some implementations, the user may be allowed to modify existing or predefined commands that such that the existing voice command is tied to or that executes additional commands. In particular example, instead of setting up a new command such as "Set up living room for theater mode," the user may be able to modifying the "Turn on living room television in theater mode" command to turn on the television in theater mode, close the window blinds, turn off or dims the living room lights and so on.

Other variations on the techniques and systems described above would be apparent to one of ordinary skill in the art in view of this disclosure and the implementations of the system disclosed herein are not limited to any particular technique.

For example, in some implementations, the secondary device 502 may be a power device for another device for which power is to be controlled. In a particular example, the device for which power is to be controlled may be a standard or "dumb" lamp. The secondary device 502 may be a device into which the lamp is plugged and which in turn plugs into a power source (e.g., a wall socket). Such a power device may, based on control signals received from the voice controlled device 200, switch power to the lamp on and off. In another such example, the secondary device 502 may be a power strip into which multiple devices are plugged. When a new device is plugged into the power strip, the power strip may operate in a similar manner to that discussed above to initiate a configuration process for the particular outlet of the power strip into which the new device is plugged. In such a case, the pairing may have previously been completed and the device profile, user profiles and/or profiles may be updated to allow for different and/or additional device names and commands to be associated with the power strip and, more particularly, commands to control the outlet into which the lamp is plugged.

In another variation or addition, the secondary device 502 may send information back to the voice controlled device 200 in response to a command. For example, in the case of the command resulting in an error, the secondary device may return the error to the voice controlled device 200 and the voice controlled device 200 may process the error and output an audio signal informing the user of the error.

In still another variation or addition, the secondary device 502 may be controlled in other ways (e.g., a button on the secondary device 502) and the secondary device 502 may send information to the voice controlled device in response to the alternative input. For example, the secondary device 502 may have a on button and the secondary device 502 may, when the button is pressed, output a notification to the voice controlled device 200 to inform the voice controlled device that the state of the secondary device 502 has changed, allowing the voice controlled device to keep track of the state of the secondary device 502. In an example usage of such a feature in the context of FIG. 4, the user may ask, "Is the lamp on?" and the voice controlled device 200 may respond with the state of the secondary device 502 without the need to query the secondary device 502.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing system comprising:
one or more processors;
one or more non-transitory computer-readable storage media storing computer-executable instructions; and
secondary device control instructions maintained in the one or more non-transitory computer-readable storage media and executed by the one or more processors to:
detect a secondary device;
communicate with the secondary device to enable the secondary device to connect to a network and to obtain information related to the secondary device;
cause, based at least in part on detection of the secondary device, output of first audio, the first audio indicating the detection of the secondary device and requesting a user to supply a name for the secondary device;
receive first audio input data comprising the name from the user;
cause first speech processing to be performed on the first audio input data, wherein an output of the first speech processing comprises recognition data;
assign the name to the secondary device;
confirm the name assigned to the secondary device by causing output of second audio, the second audio requesting the user to speak the name of the secondary device and a command for the secondary device to execute;
receive second audio input data comprising the name of the secondary device and the command for the secondary device;
cause second speech processing to be performed on the second audio input data, wherein the second speech processing uses the recognition data; and
cause, based at least in part on the second speech processing, the secondary device to execute at least part of the command.

2. The system as recited in claim 1, wherein the instruction to communicate with the secondary device includes communication via a direct connection and enables the secondary device to connect wirelessly to a local area network (LAN).

3. The system as recited in claim 1, wherein causing output of the first audio requesting the user to supply the name for the secondary device comprises requesting the user input at least part of a spoken identifier to be used when controlling the secondary device, and wherein the information identifies a type of the secondary device.

4. The system as recited in claim 1, further comprising instructions to:
receive third audio input data from the user comprising information relating to creating a custom command;
cause third speech processing to be performed on the third audio input data;
receive fourth audio input data from the user comprising at least one action to be performed corresponding to the custom command;
cause fourth speech processing to be performed on the fourth audio input data; and
configure the custom command to invoke the at least one action to be performed.

5. The system as recited in claim 1, further comprising instructions to receive a confirmation message that the secondary device is able to be controlled based at least in part on a determination that the secondary device has used the recognition data and has executed the at least the part of the command.

6. The system as recited in claim 3, wherein the information further identifies a list of functions that the secondary device is capable of executing.

7. The system as recited in claim 1, further comprising instructions to compare the command with a list of functions that the device is able to execute.

8. A method comprising:
receiving an indication of a secondary device available to be controlled;
communicating with the secondary device to obtain information related to the secondary device;
based at least in part on receiving the indication, causing output of first audio requesting a user to supply a name for the secondary device;
receiving first audio input data comprising the name from the user;
causing first speech processing to be performed on the first audio input data, wherein an output of the first speech processing comprises recognition data associated with the secondary device;
causing output of second audio, the second audio requesting that the user provide a name for the secondary device and a command for the secondary device to execute;
receiving second audio input data comprising at least the name of the secondary device and the command for the secondary device to execute;
causing second speech processing to be performed on the second audio input data, wherein the second speech processing uses the recognition data; and
confirming that the secondary device is capable of being controlled based at least in part on the secondary device executing at least part of the command.

9. The method as recited in claim 8, further comprising communicating with the secondary device to enable the secondary device to connect to a network.

10. The method as recited in claim 8, wherein the name comprises at least part of a spoken identifier for the secondary device and wherein the output of the first audio includes information indicating one or more of detection of the secondary device or a type of the secondary device.

11. The method as recited in claim 8, wherein the output of the first audio includes information about the secondary device.

12. The method as recited in claim 11, wherein the information about the secondary device indicates a type of the secondary device.

13. The method as recited in claim 8, further comprising:
receiving third audio input data from the user comprising information relating to creating a custom command;
causing third speech processing to be performed on the third audio input data, the custom command relating to configuring a particular command to invoke functions of a plurality of secondary devices;
receiving fourth audio input data from a user comprising at least one action to be performed corresponding to the custom command;
causing fourth speech processing to be performed on the fourth audio input data; and
configuring the custom command to invoke the at least one action to be performed.

14. The method as recited in claim 8, wherein the secondary device is controlled using at least one protocol, the at least one protocol being at least one of Zigbee, Z-wave, Insteon, Bluetooth, Wi-Fi, or Wi-Fi Direct.

15. One or more non-transitory computer-readable storage media storing computer-executable instructions executable in at least one computing device, whereupon execution of the computer-executable instructions causes performing of operations comprising:

detecting that a secondary device is available to be controlled;

communicating with the secondary device to obtain information related to controlling the secondary device;

based at least in part on detecting that the secondary device is available to be controlled, causing output of a first request for a user to supply a name that is to be used subsequently to control the secondary device;

receiving first natural language input data comprising the name from the user;

cause first speech processing to be performed on the first natural language input data, wherein an output of the first speech processing comprises recognition data;

assigning the name to the secondary device; and confirming the name assigned to the secondary device, the confirming based at least in part on:

causing output of a second request, the second request requesting the user to provide the name of the secondary device and a command for the secondary device to execute, receiving second natural language input data comprising at least the name of the secondary device and the command for the secondary device to execute, causing second speech processing to be performed on the second natural language input data, the second speech processing using the recognition data, and causing the secondary device to execute at least part of the command.

16. The one or more non-transitory computer-readable media as recited in claim 15, wherein the user is a first user, and the recognition data is first recognition data associated with the first user of a plurality of users of a device associated with the one or more processors, and wherein the instructions further comprising instructions for:

storing the first recognition data such that the first recognition data is associated with the secondary device and the first user;

storing second recognition data such that the second recognition data is associated with the secondary device and a second user of the plurality of users; and storing third recognition data such that the third recognition data is associated with the secondary device, the first user, and the second user.

17. The one or more non-transitory computer-readable media as recited in claim 16, wherein the first recognition data, the second recognition data, and the third recognition data are stored in a hash table.

18. The one or more non-transitory computer-readable media as recited in claim 15, wherein the output of the first request includes information about the secondary device and a type of the secondary device.

19. The one or more non-transitory computer-readable media as recited in claim 15, the instructions further comprising instructions for communicating with the secondary device to enable the secondary device to connect to a network.

20. The one or more non-transitory computer-readable media as recited in claim 15, wherein the command is a first command and the instructions further comprising instructions for:

receiving third natural language input data comprising a second command for the secondary device;

causing third speech processing to be performed on the third natural language input data, wherein the third speech processing uses the recognition data;

based at least in part on an output of the third speech processing, communicating with the secondary device to issue at least part of the second command to the secondary device;

receiving a response to issue at least part of the second command to the secondary device; and causing output of an audible message to the user based at least in part on the response.

21. The one or more non-transitory computer-readable media as recited in claim 15, wherein confirming the name assigned to the secondary device further includes causing output of a confirmation message that indicates that the secondary device is available to be controlled.

\* \* \* \* \*